(12) United States Patent
Miyake et al.

(10) Patent No.: US 11,408,560 B2
(45) Date of Patent: Aug. 9, 2022

(54) SAFETY CONTROLLER AND HISTORY DISPLAY DEVICE

(71) Applicant: Keyence Corporation, Osaka (JP)

(72) Inventors: Ryuma Miyake, Osaka (JP); Yuta Kato, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 53 days.

(21) Appl. No.: 17/066,491

(22) Filed: Oct. 9, 2020

(65) Prior Publication Data

US 2021/0148510 A1 May 20, 2021

(30) Foreign Application Priority Data

Nov. 19, 2019 (JP) .............................. JP2019-209183

(51) Int. Cl.
*F16P 3/14* (2006.01)
*G01V 8/20* (2006.01)

(52) U.S. Cl.
CPC ............... *F16P 3/144* (2013.01); *F16P 3/142* (2013.01); *G01V 8/20* (2013.01)

(58) Field of Classification Search
CPC .............. F16P 3/144; F16P 3/142; G01V 8/20
See application file for complete search history.

(56) References Cited

U.S. PATENT DOCUMENTS

| | | | |
|---|---|---|---|
| 6,137,408 A | 10/2000 | Okada | |
| 6,204,575 B1 | 3/2001 | Yamaguchi | |
| 6,414,603 B1 | 7/2002 | Yamaguchi et al. | |
| 6,784,415 B2 | 8/2004 | Kudo et al. | |
| 6,894,623 B2 | 5/2005 | Hama et al. | |
| 7,411,319 B2 | 8/2008 | Suhara et al. | |
| 7,485,841 B2 | 2/2009 | Inoue et al. | |
| 7,696,469 B2 | 4/2010 | Inoue et al. | |
| 8,346,510 B2 | 1/2013 | Fukumura et al. | |
| 8,415,609 B2 * | 4/2013 | Kawabata | G01S 17/04 250/221 |
| 9,200,955 B2 | 12/2015 | Kawabata et al. | |
| 9,939,518 B2 | 4/2018 | Tagashira et al. | |
| 9,939,528 B2 | 4/2018 | Yamazaki et al. | |
| 9,973,701 B2 | 5/2018 | Yamazaki et al. | |
| 9,976,700 B2 | 5/2018 | Kawanaka et al. | |
| 10,174,880 B2 | 1/2019 | Kawanaka et al. | |
| 2003/0029992 A1 | 2/2003 | Kudo et al. | |

(Continued)

FOREIGN PATENT DOCUMENTS

JP          2014016930 A       1/2014

OTHER PUBLICATIONS

U.S. Appl. No. 17/066,499, filed Oct. 9, 2020 (62 pages).
U.S. Appl. No. 17/066,501, filed Oct. 9, 2020 (72 pages).
U.S. Appl. No. 17/066,503, filed Oct. 9, 2020 (70 pages).

*Primary Examiner* — Carlos Amaya
(74) *Attorney, Agent, or Firm* — Kilyk & Bowersox, P.L.L.C.

(57) ABSTRACT

Recording a history related to an operation of a safety program contributes to a determination of a cause of a false OFF signal. A safety controller acquires, from at least one safety input device or safety sensor, extra information that is not used for obtaining an output signal and records an input signal and an output signal together with the extra information as history information at predetermined recording intervals.

18 Claims, 12 Drawing Sheets

(56) References Cited

U.S. PATENT DOCUMENTS

| | | |
|---|---|---|
| 2009/0295577 A1 | 12/2009 | Yamaguchi |
| 2019/0316381 A1 | 10/2019 | Oh et al. |
| 2019/0316405 A1 | 10/2019 | Kashima et al. |
| 2020/0057423 A1 | 2/2020 | Babasaki et al. |

* cited by examiner

SAFETY CONTROLLER AND HISTORY DISPLAY DEVICE

CROSS-REFERENCE TO RELATED APPLICATIONS

The present application claims foreign priority based on Japanese Patent Application No. 2019-209183, filed Nov. 19, 2019, the contents of which are incorporated herein by reference.

BACKGROUND OF THE INVENTION

1. Field of the Invention

The present invention relates to a safety controller and a history display device.

2. Description of Related Art

Many industrial machines, which become hazard sources, operate in a production factory that produces products. A safety system is an essential system for securing the safety of humans against such industrial machines (JP 2014-16930 A).

The safety system outputs an ON signal if free from danger and outputs an OFF signal if there is a possibility of danger. Further, two microcontroller units (MCU) are provided to increase reliability of the safety system. The safety system outputs an ON signal only when both the two MCUs output an ON signal. When either one of the two MCUs outputs an OFF signal, the safety system outputs an OFF signal. The safety system designed as described above prevents a false ON signal from being output. On the other hand, the safety system is allowed to output a false OFF signal from the viewpoint of securing the safety of operators.

However, when the false OFF signal is output, an industrial machine will stop, thereby reducing efficiency in production of products. It is required that a cause of the false OFF signal be quickly determined.

SUMMARY OF THE INVENTION

It is therefore an object of the present invention to contribute to a determination of a cause of a false OFF signal through recording of a history related to an operation of a safety program.

Provided according to an aspect of the present invention is, for example, a safety controller including an input part to which an input signal is input from at least one safety input device or safety sensor, a safety control part that performs a predetermined operation on the input signal to obtain an output signal and outputs, as the output signal, an ON signal that permits an actuator to operate or an OFF signal that brings the actuator to a stop, an acquisition unit that acquires, from the at least one safety input device or safety sensor, extra information that is not used for obtaining the output signal, and a history recording unit that records the input signal and the output signal together with the extra information as history information.

According to the aspect of the present invention, recording a history related to an operation of a safety program can contribute a determination of a cause of a false OFF signal.

DETAILED DESCRIPTION OF PREFERRED EMBODIMENTS

Figure 1:
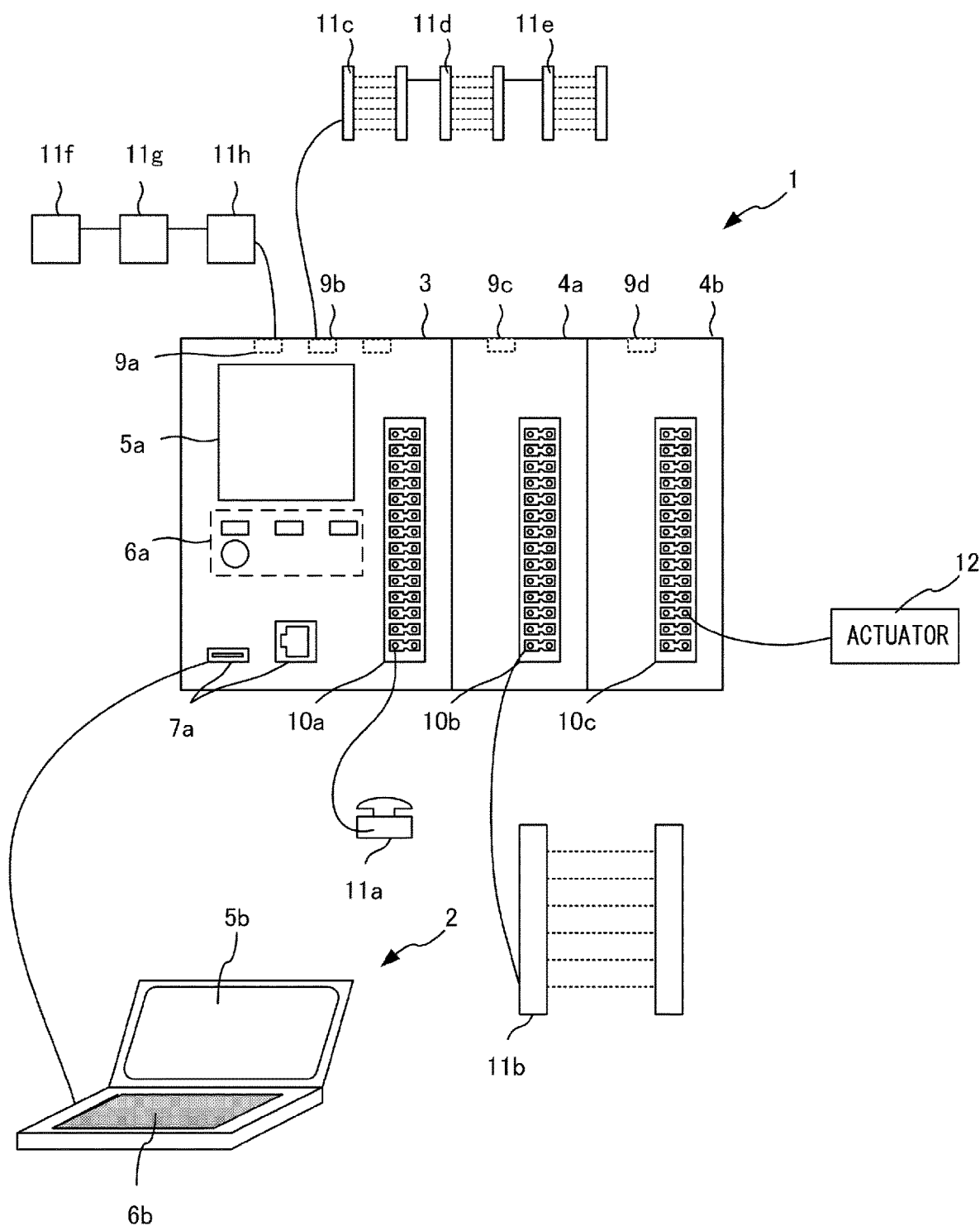
FIG. 1 is a diagram for describing a safety controller.

An embodiment will be described below in detail with reference to the accompanying drawings. Note that the following embodiment is not intended to restrict the invention according to the claims, and all combinations of the features described in the embodiment are not essential to the invention. At least two of the plurality of features described in the embodiment may be selectively combined. Further, the same or similar components are denoted by the same reference numerals, and no repetition of the same description is made. In particular, lowercase alphabets are given to make a distinction between a plurality of components of the same type, and when a description common to a plurality of components is given, the lowercase alphabets may be omitted.

(Safety Controller)
FIG. 1 shows the whole of a system. In this example, a safety controller 1 includes a main module 3 and extension modules 4a, 4b. The main module 3 executes a safety program transferred from a PC 2 that serves as a creation assistance device to assist a user in creating the safety program. The main module 3 includes a display device 5a, a control panel 6a, a communication connector 7a, an IO connector 10a, compatible ports 9a, 9b, and the like. The PC 2 similarly includes a display device 5b and a control panel 6b. The communication connector 7a may be a USB connector or a wired LAN connector. A communication cable from the PC 2 is connected to the communication connector 7a. The wired LAN may be industrial Ethernet (registered trademark). LAN is an abbreviation for local area network. A safety input device 11a such as an emergency stop switch or a light curtain is connected to an input terminal of the IO connector 10a. An industrial device such as a robot arm is connected, as an actuator (hazard source), to an output terminal of the IO connector 10a.

Safety input devices 11c to 11h and the like each having an interface adaptable to the compatible ports 9a, 9b are connected to the compatible ports 9a, 9b. Examples of the safety input device 11 connectable to the compatible ports 9a, 9b include a safety sensor such as a light curtain, a safety laser scanner, or a door switch. The compatible port 9 is a port including an ON/OFF input terminal that receives, as a safety input signal, a safety output signal such as an OSSD signal output from the safety input device, power supply terminals such as a +24 V terminal and a 0 V terminal for supplying power to the safety input device, and a communication terminal for communicating with the safety input device. The ON/OFF input terminal is a pair of terminals that receive, as a dual-redundant safety input signal, a dual-redundant safety output signal from the safety input device in the same manner as a pair of input terminals that are included in the IO connector 10a and made dual-redundant. The compatible port 9 may include an AUX terminal or the like instead of or in addition to the communication terminal. The AUX terminal is a terminal for receiving an auxiliary signal from the safety input device 11, such as a signal showing a detection state of the safety sensor or a signal showing a detection state in a warning area different from a protection area, the signal corresponding to the OSSD signal.

The main module 3 performs, in accordance with the safety program, an arithmetic operation on the safety input signal (input value) input from the safety input device 11a to obtain an output value, and outputs the output value to an actuator 12. For example, when the emergency stop switch that is a type of safety input device 11a, is pressed down, the main module 3 changes the output value from ON (safe) to OFF (not safe). This brings the actuator 12 to a stop. In some case, the IO connector 10a provided in the main module 3 cannot accept connections from all safety input devices and actuators. In order to deal with such a case, the extension modules 4a, 4b are connected to the main module 3.

The extension modules 4a, 4b include IO connectors 10b, 10c, respectively, and are capable of accepting connections from a safety input device 11b, the actuator 12, and the like. The extension modules 4a, 4b and the main module 3 communicate with each other to transfer an input signal and an output signal. That is, the main module 3 generates the output signal by applying the safety program to the input signals acquired from the safety input device 11a connected to the main module 3 and from the safety input device 11b connected to the extension modules 4a, 4b. Furthermore, the main module 3 outputs the output signal generated in accordance with the safety program to the actuator 12 connected to the main module 3 or to the actuator 12 connected to the extension modules 4a, 4b. The extension modules 4a, 4b may also include the compatible ports 9. The safety input device or safety output device is also connectable to the compatible ports 9 of the extension modules 4a, 4b.

The safety controller 1 has a front surface on which the IO connector 10a or IO connectors 10b, 10c are provided, a rear surface attached to a fixture, and side surfaces on which other modules are placed. The compatible port 9 may be provided on the front surface of the safety controller 1 from the viewpoint of accessibility. Further, the display device 5a, the control panel 6a, the communication connector 7a, the IO connector 10a, and the like may be provided on the front surface of the safety controller 1, and, with consideration given to the size of the safety controller 1, the compatible port 9 may be provided on an upper surface or lower surface of the safety controller 1. The safety controller 1 may further include a remote IO port for communicating with a remote IO. The remote IO port is provided, for example, on the upper surface or lower surface of the safety controller 1, which is different from the surface on which the compatible port 9 is provided.

The main module 3 and the extension module 4 are connected via an internal bus, and the main module 3 communicates with the extension module 4 over the internal bus to acquire the safety input signal from the safety input device 11 connected to the IO connectors 10b, 10c. Further, the main module 3 supplies power to the safety input device 11 via the compatible port 9 while acquiring the safety input signal from the safety input device 11 and extra information from the safety input device 11. That is, the main module 3 includes a first acquisition path through which the main module 3 acquires the safety input signal (input value) from the safety input device 11b connected to the IO connector 10b of the extension module 4 via the internal bus, and a second acquisition path through which the main module 3 acquires the safety input signal (input value) from the safety input devices 11c to 11h via the compatible port 9. Note that when the remote IO port is provided, the main module 3 includes a third acquisition path via the remote IO port. Further, the main module 3 serves as a safety controller and a sensor controller. Generating the safety output signal (output value) in accordance with the safety program using the safety input signal (input value) acquired through the first and second acquisition paths corresponds to the function of the safety controller, and displaying and recording of the extra information from the safety input devices 11c to 11h such as safety sensors or controlling the safety input devices 11c to 11h such as safety sensors corresponds to the function of the sensor controller. As shown in FIG. 1, the safety input devices 11c to 11e and 11f to 11h such as safety sensors are connectable in series. Such series connection allows power to be supplied from the safety controller 1 to each safety input device 11. Further, the safety input devices 11c, 11h located adjacent to the safety controller 1 may perform a logical operation on the safety output signal from each safety input device 11 to merge the safety output signals. This allows a pair of safety output signals to be input to the safety controller 1 as a pair of safety input signals. Further, each of the safety input devices 11 connected in series communicates the extra information the safety input device 11 has to the safety controller 1. The safety sensor generally determines whether to output ON or OFF as the safety output signal based on a detection result in the protection area to be monitored, a predetermined determination condition, and an error detection result. The extra information includes, for example, the detection result in the protection area from the safety sensor, the error detection result, and the like, and assists in determining a cause of the safety output signal being an OFF signal.

(Hardware of Main Module and Extension Module)

Figure 2:
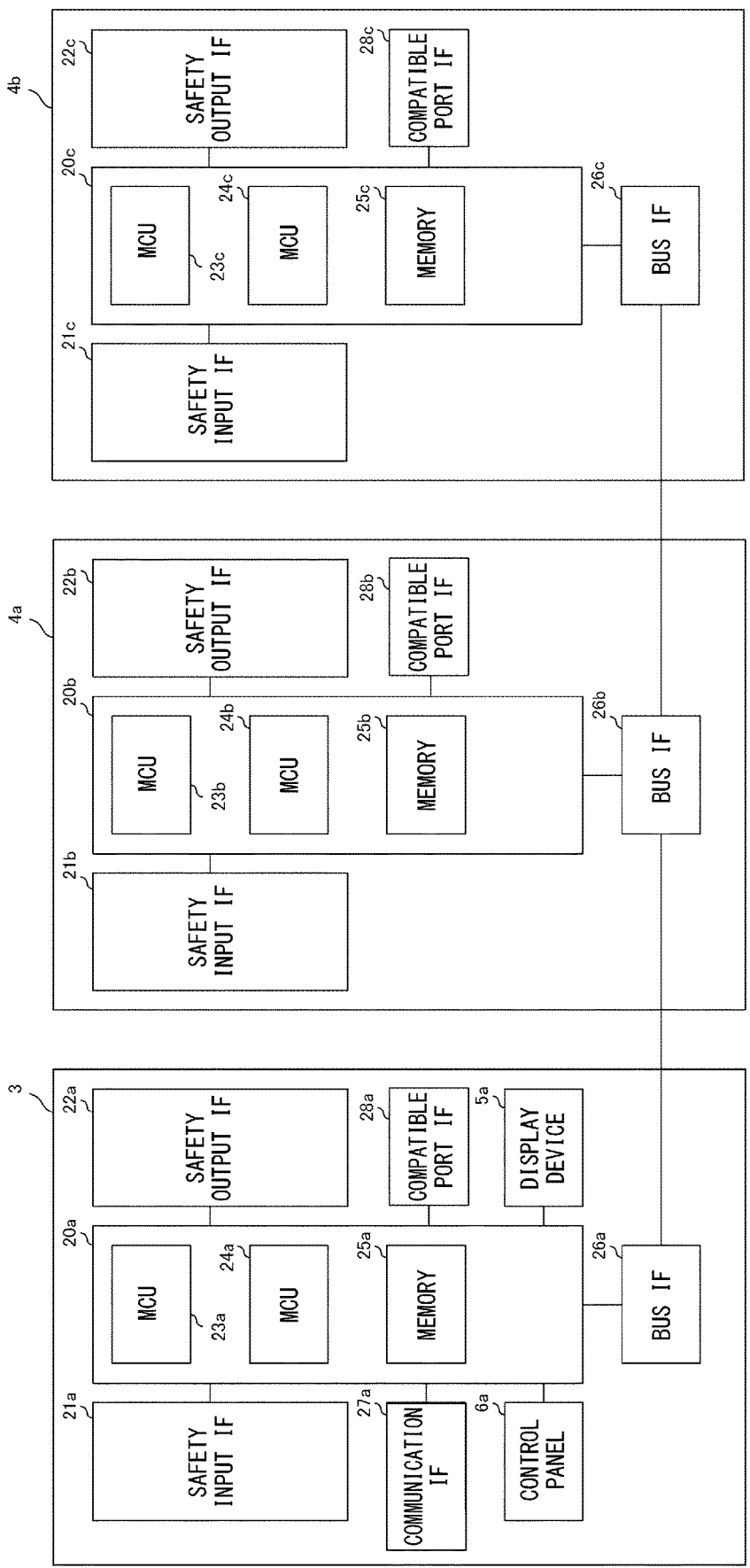
FIG. 2 is a diagram for describing a main module and an extension module.

As shown in FIG. 2, a controller 20a of the main module 3 includes two MCUs 23a, 24a and a memory 25a. The controller 20a stores the safety program and history recording program received from the PC 2 into the memory 25a. Two micro controller units (MCUs) are provided to increase reliability. The MCUs 23a, 24a each execute the safety program and history recording program stored in the memory 25a. The MCUs 23a, 24a generate an output signal based on an input signal input from the safety input device 11 via a safety input IF 21a and an input signal input from the extension module 4 via a bus IF 26a, and output the output signal to a safety output IF 22a and the extension module 4. For example, when both of the MCUs 23a, 24a output an ON signal, the safety output IF 22a outputs an ON signal. When either or both of the MCUs 23a, 24a output an OFF signal, the safety output IF 22a outputs an OFF signal. As described above, the controller 20a communicates with the extension module 4 via the bus IF 26a to receive the input signal and send the output signal. A communication IF 27a communicates with another device (for example, a PC 2) via the communication connector 7a. A circuit for the OSSD signal, power supply, and communication of the compatible port 9 may be included in a compatible port IF 28a, or may be implemented as a separate circuit.

Examples of the safety input device include a safety laser scanner and a light curtain. The safety input device generally meets a safety standard, and the output of the safety input device is made dual-redundant. When a signal mismatch occurs due to dual-redundancy, the safety controller or sensor itself can detect the failure of its sensor.

A controller 20b of the extension module 4a includes two MCUs 23b, 24b and a memory 25b. Two micro controller units (MCUs) are provided to increase reliability. The MCUs 23b, 24b each execute a control program stored in the memory 25b. Upon receipt of an input signal from the safety input device 11 via a safety input IF 21b, the controller 20b sends the input signal to the main module 3 via a bus IF 26b. Upon receipt of an output signal from the main module 3 via the bus IF 26b, the controller 20b outputs the output signal to the actuator 12 or the like via the safety output IF 22b. A compatible port IF 28b may be provided as a circuit for the compatible port 9.

A controller 20c of the extension module 4b includes two MCUs 23c, 24c and a memory 25c. Two micro controller units (MCUs) are provided to increase reliability. The MCUs 23c, 24c each execute a control program stored in the memory 25c. Upon receipt of an input signal from the safety input device 11 via a safety input IF 21c, the controller 20c sends the input signal to the main module 3 via a bus IF 26c. Upon receipt of an output signal from the main module 3 via the bus IF 26c, the controller 20c outputs the output signal to the actuator 12 or the like via a safety output IF 22c. A compatible port IF 28c may be provided as a circuit for the compatible port 9.

(Hardware of PC)

Figure 3:
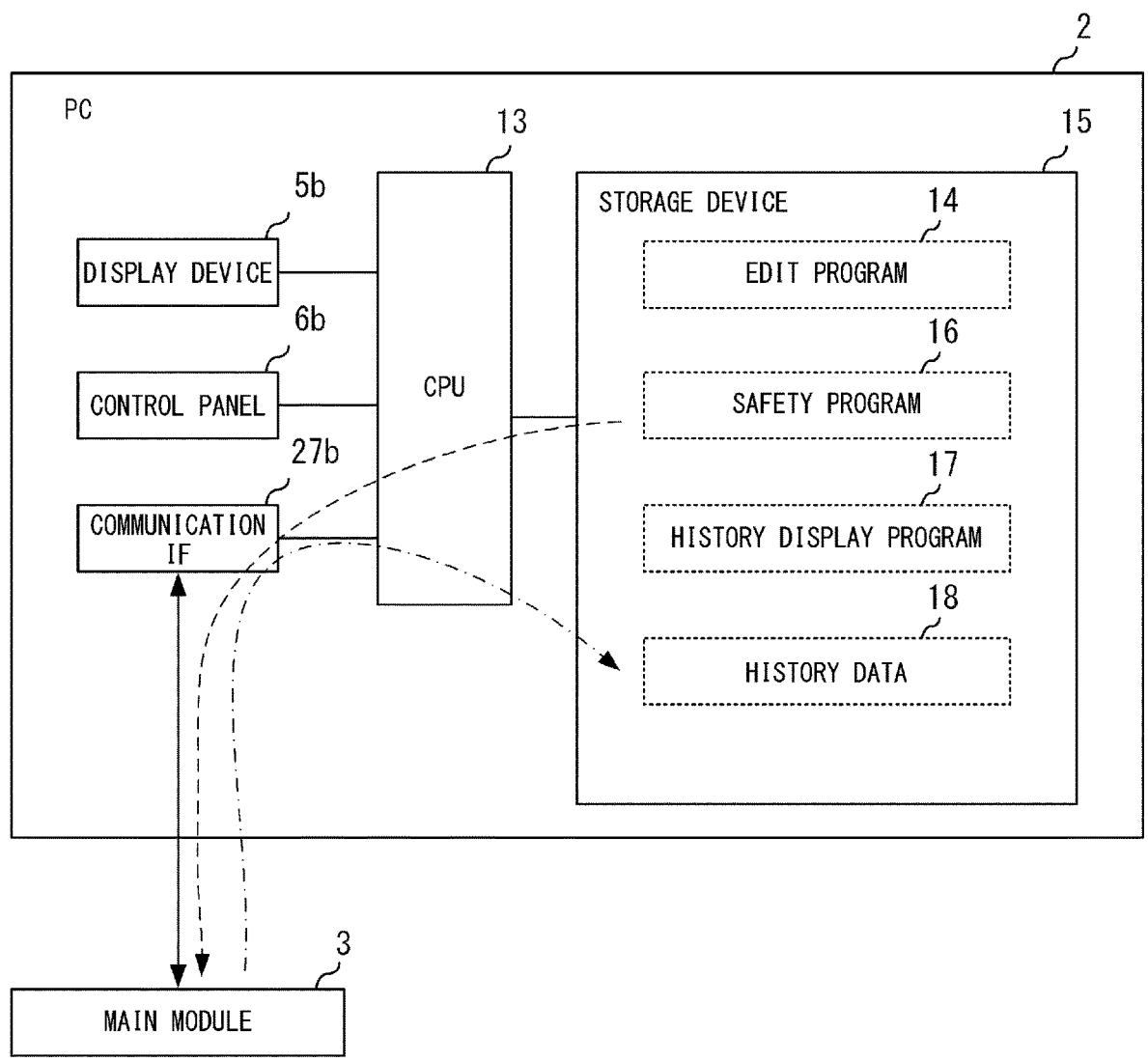
FIG. 3 is a diagram for describing a program creation assistance device.

As shown in FIG. 3, the PC 2 includes a CPU 13, the display device 5b, the control panel 6b, a storage device 15, and a communication IF 27b. The display device 5b, the control panel 6b, the storage device 15, and the communication IF 27b are each electrically connected to the CPU 13. Examples of the storage device 15 include a RAM, a ROM, an HDD, and an SSD, and may further include a removable memory card. CPU is an abbreviation for central processing unit. ROM is an abbreviation for read-only memory. RAM is an abbreviation for random access memory. HDD is an abbreviation for hard disk drive. SSD is an abbreviation for solid state drive.

The user of the PC 2 causes the CPU 13 to execute an edit program 14 stored in the storage device 15 to edit the safety program 16, history recording program, configuration information, or the like through the control panel 6b and to transfer the safety program, history recording program, configuration information, or the like to the main module 3. The configuration information includes identification information on the extension module 4 connected to the main module 3, and identification information (terminal assignment information) on the safety input device 11 and the actuator 12 each connected to a corresponding one of the input terminals and output terminals provided in the IO connectors 10a to 10c.

The CPU 13 stores history data 18 read from the main module 3 into the storage device 15. The CPU 13 displays the history data 18 on the display device 5b in accordance with a history display program 17. The history data 18 will help determine the cause of the false OFF signal.

(User Interface (UI))

Figure 4:
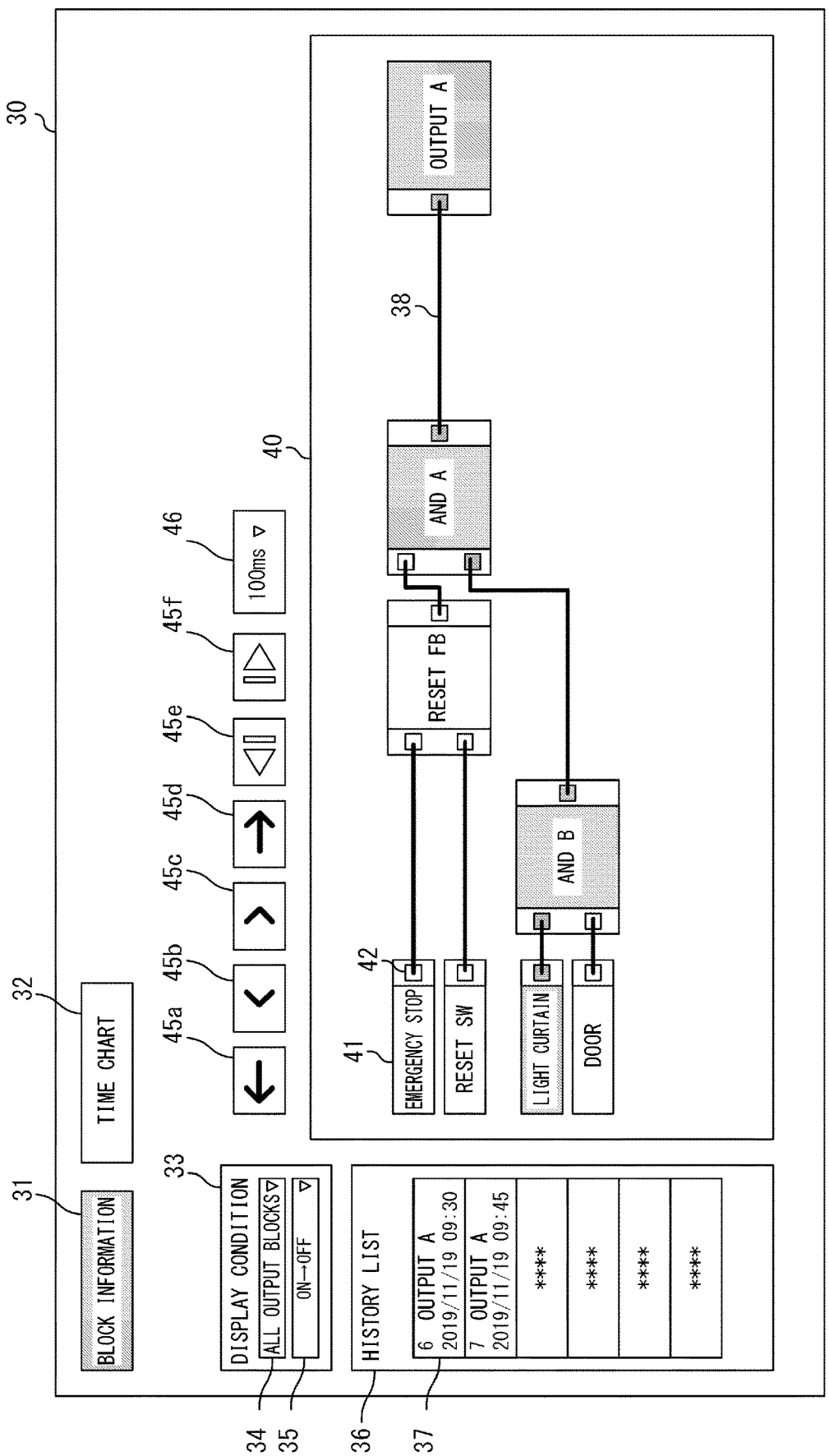
FIG. 4 is diagram for describing a user interface.

FIG. 4 shows a history display UI 30 displayed on the display device 5b by the CPU 13 in accordance with the history display program 17. The history display UI 30 has at least two display modes.

(1) Block Information Mode

A first display mode is a block information mode. The block information mode is a mode in which the history data 18 is displayed in association with a plurality of function blocks making up the safety program. Upon detection of a touch or click on a block information button 31, the CPU 13 displays, in a block display section 40, icons of function blocks 41 making up the safety program 16, an icon of a terminal 42 of each of the function blocks, and a connection line 38 connecting between terminals. A display condition selection section 33 is used to input a condition for filtering data to be displayed among the history data 18 recorded by the main module 3. Condition designation sections 34, 35 are pull-down menus for displaying a list of a plurality of condition candidates prepared in advance and designating two conditions from the list. A history list 36 displays a list of records (events 37) extracted under the display condition. The event 37 may include a serial number of a record (event number), a recording date and time of the event (time stamp), a name of a function block in which the event occurred (identification information), and the like. For example, the event 37 may include extra information on an input device connected to the compatible port of the main module 3 or a program. Note that each record may be recorded when a predesignated event occurs, or alternatively, may be recorded at every scan cycle of the safety program 16. When the user selects any event 37 from among the events 37 displayed in the history list 36, the CPU 13 reads an event record corresponding to the selected event 37 from the history data 18 and reflects the event record in the block display section 40. For example, the CPU 13 may color the icon of the function block 41 in the ON state light blue or light green, or colors the icon of the function block 41 in the OFF state light pink or orange. Similarly, the CPU 13 may color the icon of the terminal 42 in the ON state blue or green, or color the icon of the terminal 42 in the OFF state red. This will make it easier to visually recognize a logic of a signal and a state of each function block.

An operation button 45a is a button for changing the display target to the first record or event. An operation button 45b is a button for moving the focus onto the previous signal change point for the designated signal or block. An operation button 45c is a button for moving the focus onto the next signal change point for the designated signal or block. An operation button 45d is a button for changing the display target to the last record or event. An operation button 45e is a button for changing a state corresponding to the display target to a state one step before. An operation button 45f is a button for changing a state corresponding to the display target to a state one step later. A menu 46 is a pull-down menu for selecting one step time interval (for example, 100 ms, 200 ms, 500 ms, or the like).

(2) Time Chart Mode

Upon detection of a click on or touch of a time chart button 32, the CPU 13 switches the display mode from the first display mode to a second display mode. The second display mode is a time chart mode for displaying the history data 18 in a time chart form.

Figure 5:
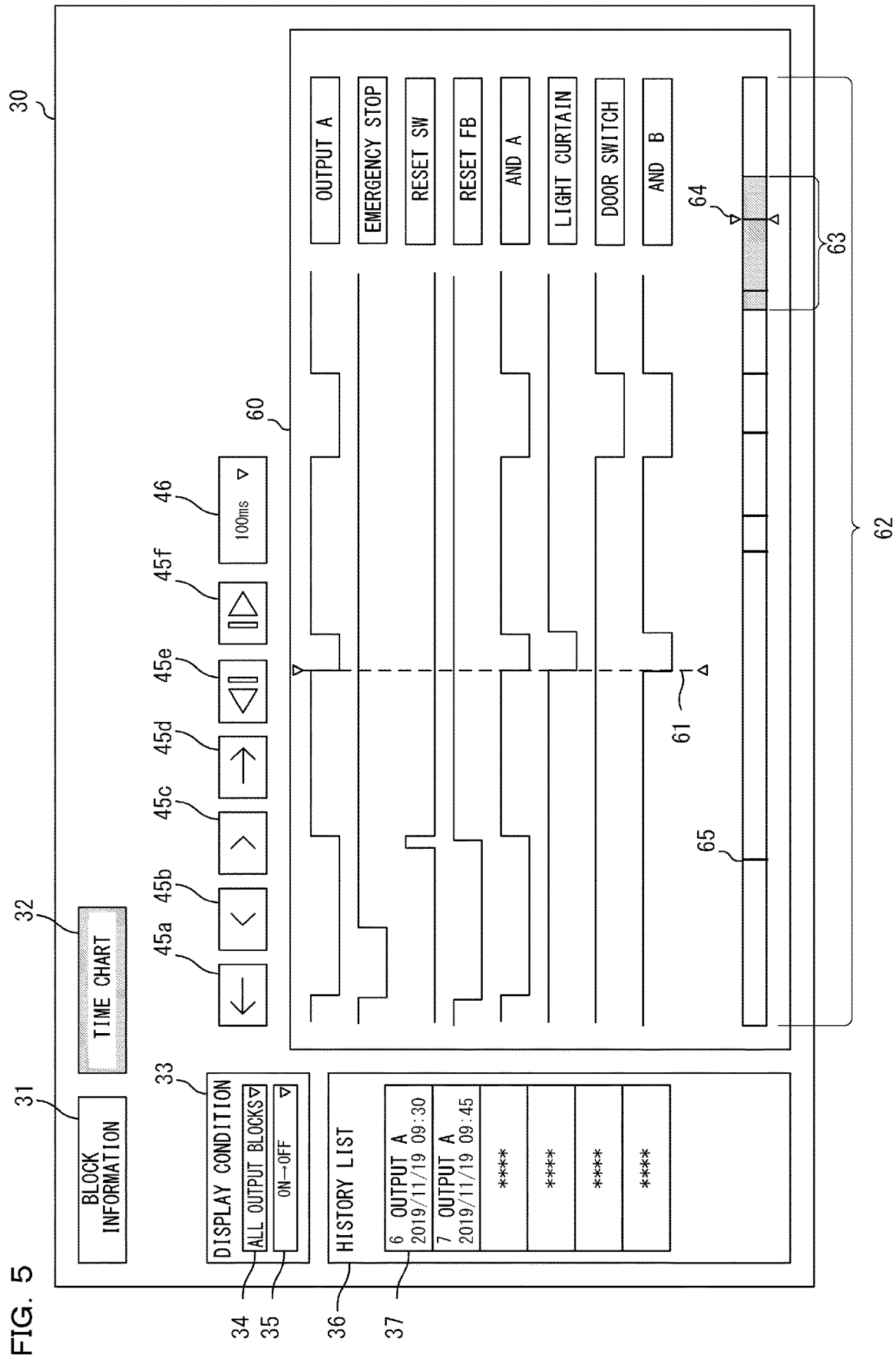
FIG. 5 is a diagram for describing a user interface.

FIG. 5 shows a time chart UI 60. In this example, the time chart UI 60 is displayed in replace of the block display section 40, but both the time chart UI 60 and the block display section 40 may be displayed side by side. For example, the time chart UI 60 may be displayed in a first window, and the block display section 40 may be displayed in a second window.

The time chart UI 60 displays various safety input signals and safety output signals and states of output terminals of the function blocks included in the history data 18. A current position bar 61 is a bar showing the position of a time stamp of an event or record currently selected by the user. A time bar 62 is a graphical object showing an entire history recording period from the time stamp of the first record to the last record recorded in the history data 18. An event bar 65 is an object showing an event occurrence time. A hatched time chart period 63 is an object clearly showing a period (display target period) from the start time to end time of the time chart displayed on the time chart UI 60. A current position object 64 corresponds to the time indicated by the current position bar 61.

In this example, it is shown that, when an emergency stop switch is pressed, a reset function block is turned to OFF, a first AND block is turned to OFF, and consequently an output block A is turned to OFF. Further, it is shown that, when a reset switch is pressed, the reset function block is reset from OFF to ON, the first AND block is turned to ON, and consequently the output block A is turned to ON.

At the next event corresponding to the current position bar 61, it is shown that, when light across the light curtain is blocked, the light curtain is turned to OFF, a second AND block is turned to OFF, the first AND block is turned to OFF, and consequently the output block A is turned to OFF. When the blocking of the light across the light curtain is released, the light curtain is reset to ON, the second AND block is also turned to ON, the first AND block is also turned to ON, and consequently the output block A is turned to ON.

In the next event, it is shown that, when a door to which the door switch is attached is opened, the door switch is turned to OFF, the second AND block is turned to OFF, the first AND block is turned to OFF, and consequently the output block A is turned to OFF. It is shown that, when the door is shown, the door switch is reset to ON, the second AND block is also turned to ON, the first AND block is also turned to ON, and consequently the output block A is turned to ON.

In the meantime, the main module 3 of this example may acquire extra information from the safety input device such as the light curtain or the door switch connected to the compatible port 9, and may record the extra information together with the state of the function block and the state of each signal in the history data 18. As described above, the extra information is information that is not directly involved in the operation on the safety output signal. Incidentally, information involved in the operation on the safety output signal is ON/OFF of the light curtain or ON/OFF of the door switch.

The light curtain is a safety sensor that monitors the protection area with a plurality of optical axes, the light curtain including a plurality of pairs of light emitting elements and light receiving elements corresponding to the plurality of optical axes, the light emitting element and the light receiving element making up each pair being arranged facing each other, detects an object in the protection area by detecting the blocking of light of the optical axes, detects an error in its own circuit, and generates the safety output signal based on a result of the detection of the object and a result of the detection of the error.

The extra information on the light curtain includes, for example, at least one of detection information on an object in the protection area, information showing ON/OFF of each optical axis of the light curtain, information showing an amount of light of each optical axis of the light curtain, information showing an error detected in the light curtain, information showing a mute state of the light curtain, or information showing that the light curtain is waiting to be reset.

The safety controller 1 acquires not only information on its own safety control but also information on the generation of the safety output signal from the safety input device 11 and information on the protection area as the extra information, contributing to a determination of the cause of the false OFF signal.

The light curtain includes a first housing having the plurality of light emitting elements and a second housing disposed facing the first housing. The second housing has the plurality of light receiving elements, and outputs an ON signal when all the plurality of light receiving elements have received a predetermined amount of light. Therefore, when the optical axes of the first housing and the optical axes of the second housing are misaligned, a margin of the predetermined amount of light received becomes small. Therefore, the user will be able to appropriately review the placement of the light curtain by acquiring an event about the light curtain from the history data 18 and checking extra information on the optical axes.

Figure 6:
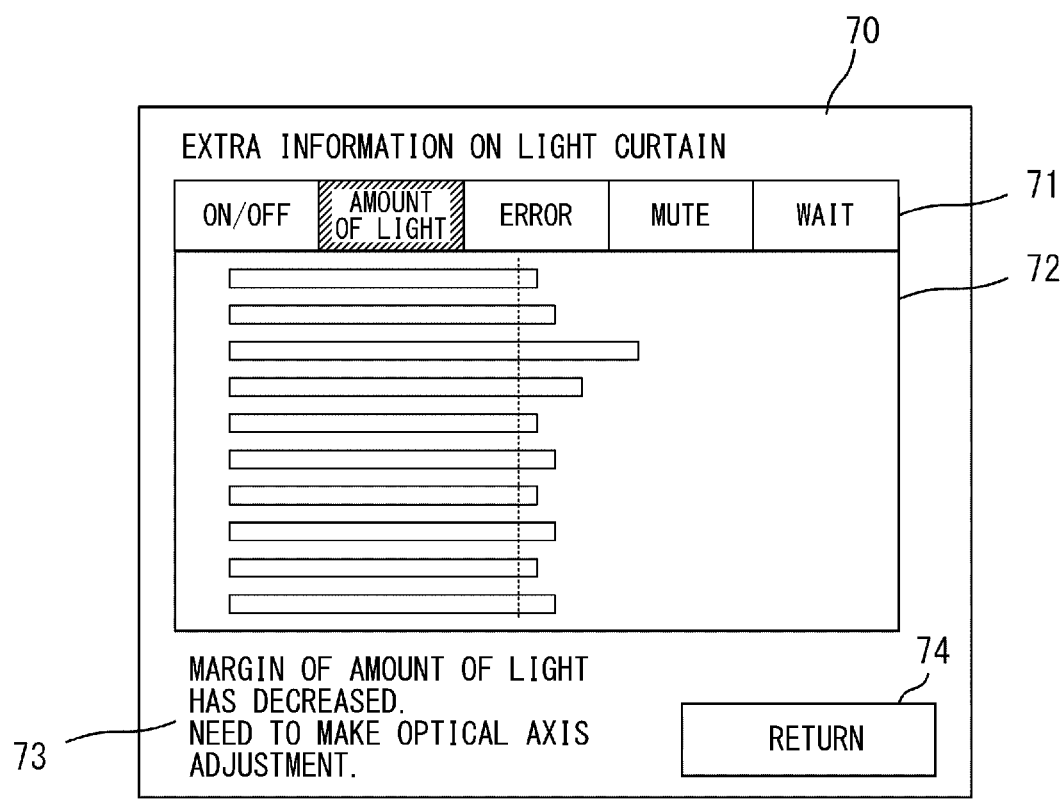
FIG. 6 is a diagram for describing a user interface.

FIG. 6 shows an extra information UI 70. When the function block corresponding to the light curtain is clicked or touched in the block display section 40 or the time chart UI 60, the extra information on the light curtain associated with the time corresponding to the current position bar 61 is read from the history data 18, and the extra information UI 70 is created and displayed on the display device 5b. The extra information UI 70 may display a plurality pieces of information. For example, the extra information UI 70 may simultaneously display ON/OFF information on the light curtain, information on the amount of light across the light curtain, and information showing an error in the light curtain.

The extra information UI 70 includes a selection section 71 for selecting one sensor information from among a plurality of pieces of sensor information included in the extra information. The CPU 13 displays the sensor information selected by the user in the selection section 71 on a sensor information display section 72. In this example, since the amount of light is selected, the amount of light received by each light receiving element that makes up the light curtain is shown. An advice display section 73 displays advice for the user. In this example, advice on a necessity of an optical axis adjustment has been given. A return button 74 is a button for instructing the CPU 13 to close the extra information UI 70 and return to the history display UI 30.

The safety laser scanner is a safety sensor that scans a preset protection area with a laser beam to detect an object in the protection area based on light reflected off the object, detects an error in its own circuit or the like, and generates the safety output signal based on a result of the detection of the object and a result of the detection of the error. The extra information on the safety laser scanner includes at least one of detection information on the object in the protection area, information showing ON/OFF of each optical axis, information showing a length or an amount of light of each optical axis of the safety laser scanner, information showing an error that has occurred in the safety laser scanner, information showing a mute state of the safety laser scanner, information showing that the safety laser scanner is waiting for release of a reset, or image information acquired by a camera provided in the laser scanner.

The safety controller 1 acquires not only information on its own safety control but also information on the generation of the safety output signal from the safety input device 11 and information on the protection area as the extra information, contributing to a determination of the cause of the false OFF signal.

The door switch is a safety sensor that includes an actuator having a transponder and a detector that detects a distance to the transponder, the actuator and the detector being installed at positions that move relative to each other as the door opens and closes, detects, by the detector, an open or closed state of the door based on the distance to the transponder, detects an error in its own circuit or the like, and generates the safety output signal based on a result of the detection of the opening or closing of the door and a result of the detection of the error. Further, the door switch may include a lock mechanism that prevents the door from being opened, and the door switch controls a lock state and an unlock state by electrically controlling a lock pin of the lock mechanism.

The extra information on the door switch includes at least one of information on detection of the opening or closing of the door, information showing lock control of the door switch, information showing an error that has occurred in the door switch, information showing a mute state of the door switch, and information showing that the door switch is waiting to locked.

The safety controller 1 acquires not only information on its own safety control but also information on the generation of the safety output signal from the safety input device 11 and information on opening or closing of the door as the extra information, contributing to a determination of the cause of the false OFF signal.

<History Recording Process>
(Function of MCU)

Since the main module 3 includes the two MCUs 23a, 24a, only either one of the MCUs 23a, 24a may execute the history recording program, or both the MCUs 23a, 24a may execute the history recording program. In the latter case, two pieces of history data 18 are created, but one of the MCUs 23a, 24a may combine the two pieces of history data 18 into one piece based on the time stamp. Herein, a case where only either one of the MCUs 23a, 24a executes the history recording program will be described in detail.

Figure 7:
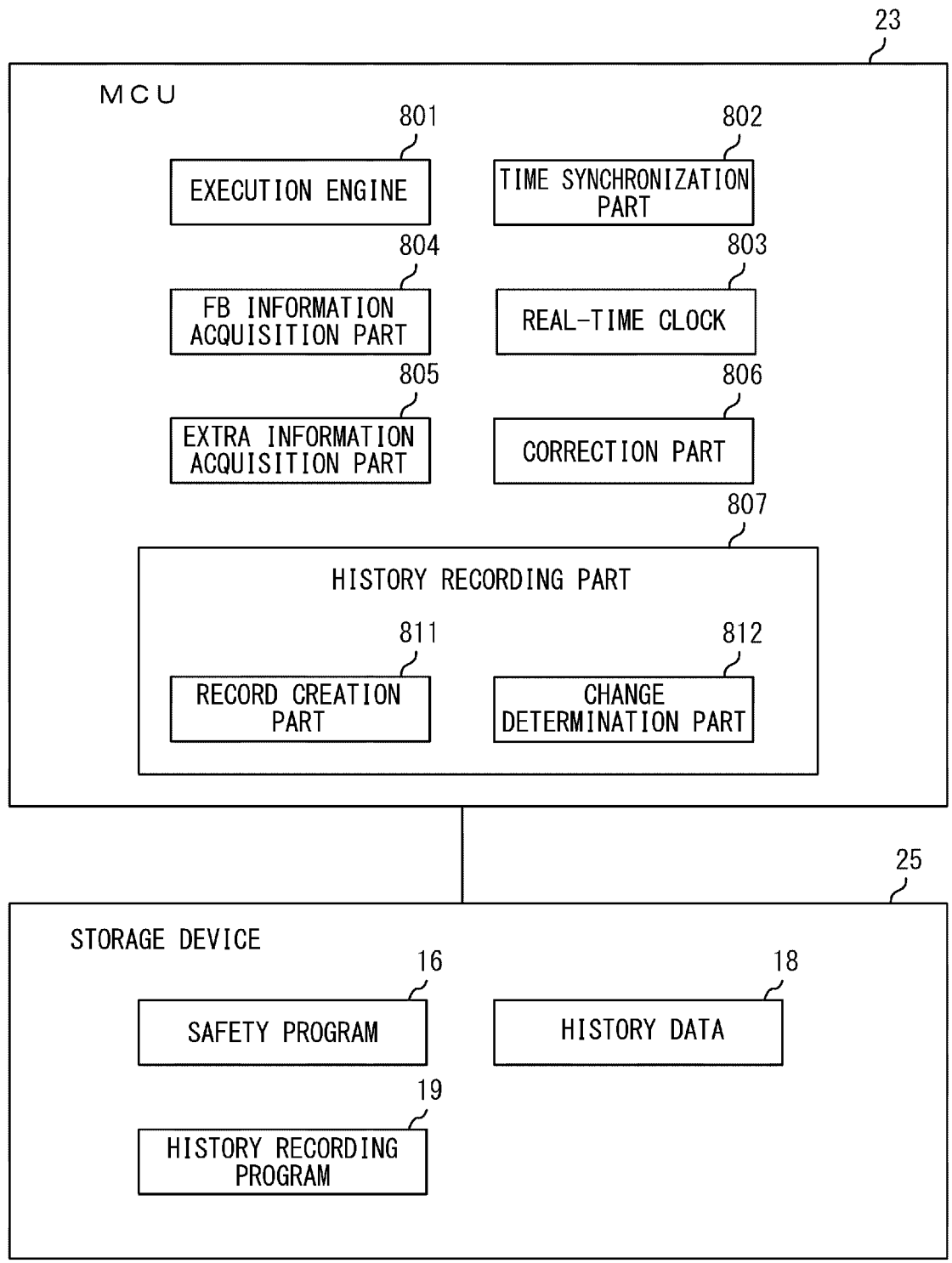
FIG. 7 is a diagram for describing functions of an MCU.

FIG. 7 shows functions implemented via a history recording program 19 executed by the MCU 23. An execution engine 801 executes the safety program 16. A time synchronization part 802 synchronizes a real-time clock of the extension module 4 and a real-time clock of the safety input device 11 connected to the compatible port 9 with a real-time clock 803 of the main module 3. An FB information acquisition part 804 acquires, from the execution engine 801, a state of each function block making up the safety program executed by the execution engine 801. An extra information acquisition part 805 communicates with the safety input device 11 connected to the compatible port 9 of the main module 3 or the extension module 4 to acquire the extra information. The safety input device 11 may add a time stamp to the extra information and send the extra information to the extra information acquisition part 805. A correction part 806 corrects the time stamp added to the extra information. There is a time delay in communication (communication processing time) between the main module 3 and the safety input device 11. Therefore, the correction part 806 corrects the time stamp added to the extra information by the time delay in communication. When a recording condition is satisfied, a history recording part 807 creates a record including the safety input signal, the safety output signal, the state of the function block, and the extra information, adds the time stamp acquired from the real-time clock 803 to this record, and adds the record to the history data 18. The recording condition may be, for example, every scan cycle. The scan cycle corresponds to repetition intervals at which the safety program 16 is executed by the execution engine 801. That is, each time the execution engine 801 executes the safety program 16, one record is created and added to the history data 18. The recording condition may be an occurrence of a predetermined event (for example, a designated signal such as the safety output signal changes from ON to OFF) (change point recording). This brings about an advantage that the history data 18 becomes small in size.

Note that the MCU 23 may have a monitoring function (monitoring part/determination part) that determines whether the execution engine 801 has successfully processed the safety input signal or the safety output signal, or whether an error has occurred in outputs of the MCUs 23, 24. When the monitoring function detects any error, the MCU 23 forcibly turns the output to OFF.

Although not shown in FIG. 7, the MCU 23 may communicate with a device connected to the compatible port 9 to acquire model information on the device. This allows the MCU 23 to easily determine whether the device connected to the compatible port 9 is the light curtain, the door switch, or the safety laser scanner (model determination function).

(History Recording Timing)

Figure 8:
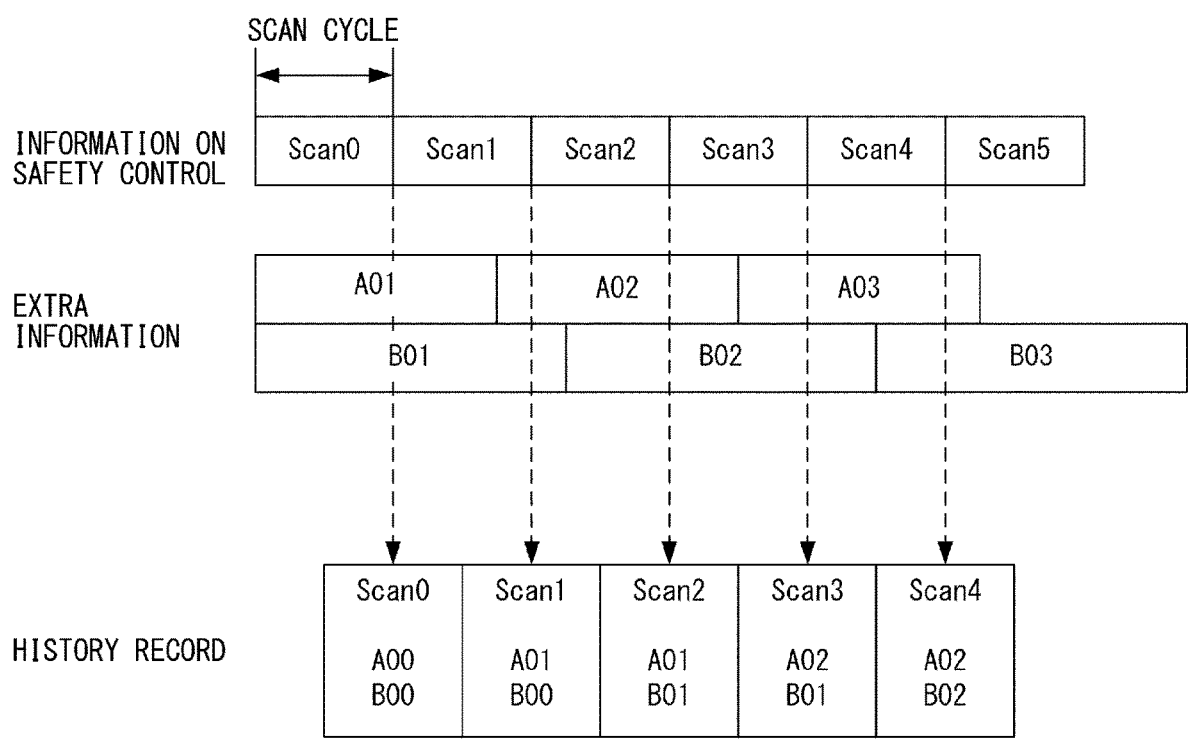
FIG. 8 is a diagram for describing history collection timing.

FIG. 8 is a diagram for describing history recording at every scan cycle. Scan0 to Scan5 are information on safety control acquired at every scan cycle. The information on safety control is, for example, information related to or involved in the operation on the safety output signal (for example, the safety input signal, the state of the function block, the safety output signal). A01 to A03 are extra information on the light curtain, for example. B01 to B03 are extra information on the door switch. In this case, since the safety input devices have individual control intervals, there is a difference in acquisition timing of the extra information. The history record includes the information on safety control and the extra information acquired at every scan cycle. Since the scan cycle and the control interval of each safety input device are different from each other, the history record includes the information on safety control and the extra information based on the scan cycle. In this case, the time stamp added to the history record corresponds to a time stamp based on the scan cycle.

In the meantime, during a safe period in which the ON signal is continuously output, a plurality of consecutive history records may be the same. In this case, the history recording part 807 may keep the first history record of the plurality of consecutive history records that are the same and delete the remaining history records (change point compression).

Herein, one history record is created at every scan cycle, or alternatively, a time stamp may be added to data to be recorded for each data type, and a record may be created for each data type. For example, the safety output signal is acquired and time-stamped at every scan cycle. Similarly, the safety input signal is acquired and time-stamped at every scan cycle. The extra information may also be acquired and time-stamped at every scan cycle or control intervals. In this case, the PC 2 may create the block display section 40 or the time chart UI 60 based on the time stamp of each piece of data and display the block display section 40 or the time chart UI 60 on the display device 5b.

(Flowchart)

Figure 9:
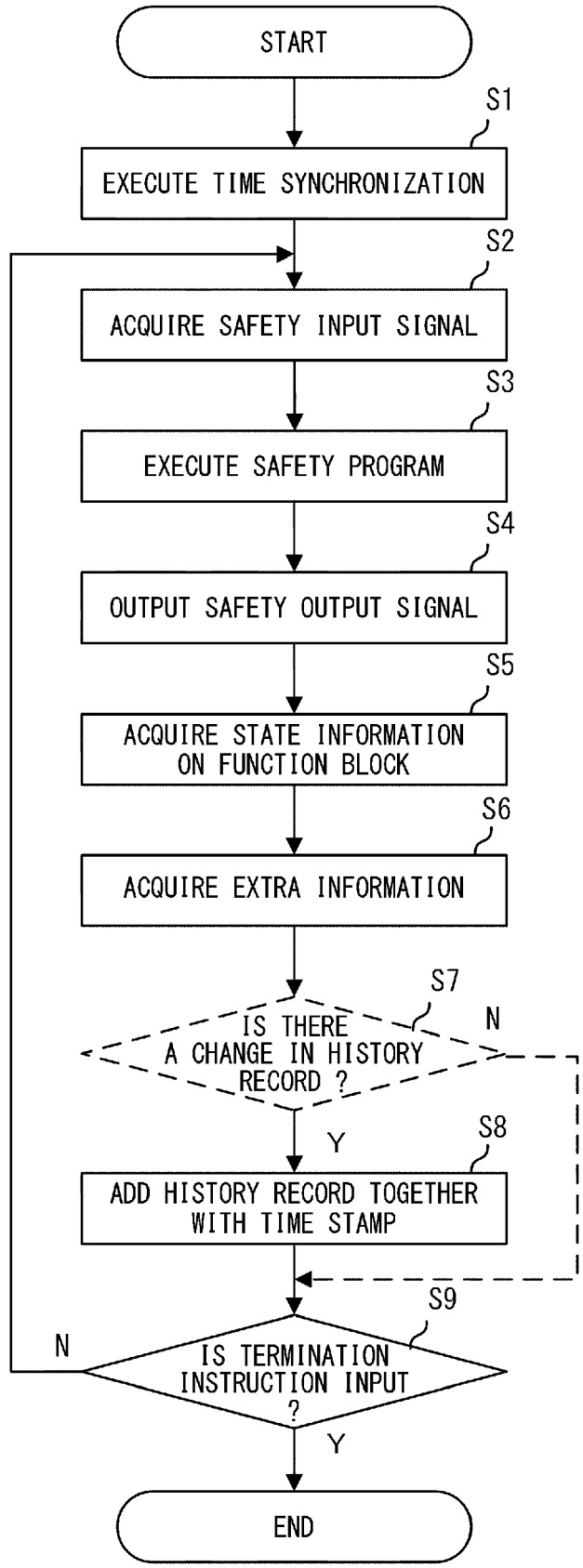
FIG. 9 is a flowchart showing a history recording method.

FIG. 9 is a flowchart showing a history recording process executed by the main module 3. The MCU 23 of the main module 3 executes the following process in accordance with the history recording program 19.

In S1, the MCU 23 (time synchronization part 802) executes time synchronization. The time synchronization part 802 sends a time synchronization command to the safety input device 11 connected to the compatible port 9, the extension module 4 connected via the bus IF 26a, and the safety input device 11 connected to the compatible port 9 of the extension module 4 to make time synchronization with the real-time clock 803.

In S2, the MCU 23 (execution engine 801) acquires the safety input signal. For example, the execution engine 801 acquires the safety input signals from both the safety input device 11 connected to the compatible port 9 and the safety input device 11 connected to the compatible port 9 of the extension module 4.

In S3, the MCU 23 (execution engine 801) executes the safety program 16. The execution engine 801 executes the safety program 16 for an operation on the safety input signals to obtain the safety output signal.

In S4, the MCU 23 (execution engine 801) outputs the safety output signal. The execution engine 801 outputs the safety output signal to an actuator connected to the safety output IF 22a and actuators connected to the safety outputs IF 22b, 22c of the extension module 4. When an actuator is connected to the compatible port 9, the safety output signal is output to the actuator via the compatible port 9.

In S5, the MCU 23 (FB information acquisition part 804) acquires state information on each function block making up the safety program 16 from the execution engine 801.

In S6, the MCU 23 (extra information acquisition part 805) acquires the extra information from both the safety input device 11 connected to the compatible port 9 and the safety input device 11 connected to the compatible port 9 of the extension module 4.

In S7, the MCU 23 (history recording part 807) creates a history record including the safety input signal, the safety output signal, the state information on each function block, and the extra information, and compares the history record with the latest history record included in the history data 18 to determine whether there is a change in the history record. The history record is created by a record creation part 811. A change determination part 812 determines a change in the history record. When there is a change in the history record, the MCU 23 proceeds to S8. When there is no change in the history record, the MCU 23 skips S8 and proceeds to S9. Note that S7 is optionally executed.

In S8, the MCU 23 (history recording part 807) adds a time stamp to the history record and adds the history record to the history data 18.

In S9, the MCU 23 (history recording part 807) determines whether the user has input a termination instruction for the history recording program 19 or the safety program 16. When the termination instruction has not been input, the MCU 23 returns to S2. When the termination instruction has been input, the MCU 23 terminates the history recording program 19.

Figure 10:
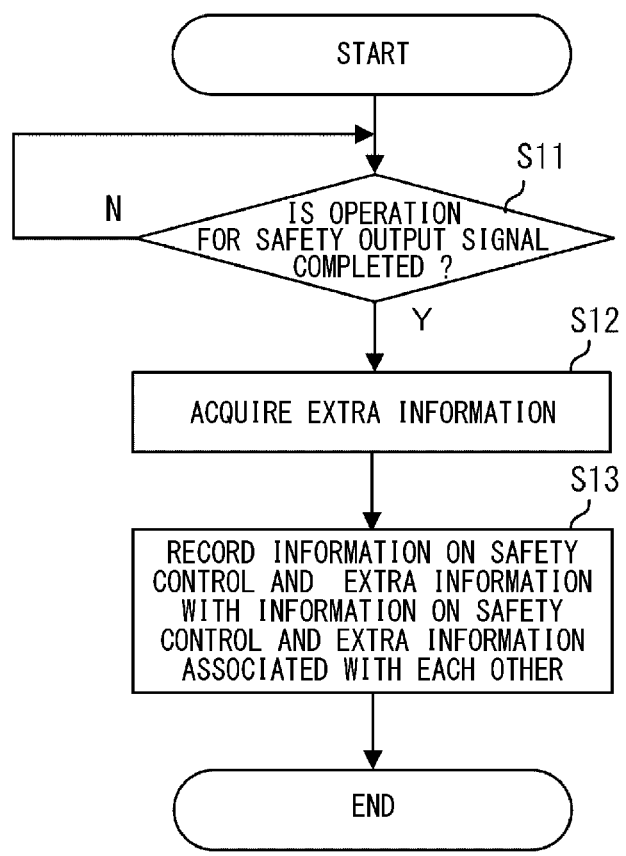
FIG. 10 is a flowchart showing a history recording method according to another aspect.

FIG. 10 shows a recording process according to another aspect. Here, the focus will fall on the recording process shown in FIG. 8. As shown in FIG. 8, the following process is executed at every scan cycle.

In S11, the MCU 23 (history recording part 807) determines whether the operation on the safety input force signals to obtain the safety output signal has been completed. After the completion of the operation, the MCU 23 proceeds to S12.

In S12, the MCU 23 (history recording part 807) acquires the extra information. The extra information to be acquired here is not extra information when the operation has been completed, but extra information at previous timing. As shown in FIG. 8, extra information at the scan cycle Scan01 is denoted by A01 and B00 rather than A02 or B01.

In S12, the MCU 23 (history recording part 807) adds, to the history data 18, the history record created by associating the extra information with the information on safety control.

(When the Safety Laser Scanner is Connected to the Compatible Port 9)

The safety laser scanner receives setting data from a setting assistance device (for example, the PC 2) that defines a protection area set in a detection area as the setting data, detects an object in the protection area received as the setting data, and outputs a safety control signal, the safety laser scanner including a light emitting unit that emits detection light to the detection area, a light receiving unit that receives light reflected off the object in the detection area to generate a light reception signal, a ranging unit that measures a distance to the object, a scan unit that executes scanning with the detection light around a rotation axis, an entry detection unit that detects, based on range information including the distance and a scan angle of the detection light and the protection area included in the setting information, the object in the protection area to create a detection signal, an output unit that outputs the detection signal as a safety output signal, and the like. Further, in order to facilitate a status check made when an object is detected in the protection area by the safety laser scanner, a memory or the like may be provided that stores a scan image, time data, a position of an optical axis that has detected an entry into the protection area, and the like as an event history. More preferably, a camera that captures an image of the detection area of the safety laser scanner may be built into the safety laser scanner. The memory may store the image of the detection area captured by the camera. The scan image is an image that is generated from the range information including the scan angle and the detection distance when the reflected light is detected and in which a plurality of pieces of range information obtained at scan cycles of the detection light are two-dimensionally represented, the scan image representing the range information as a plurality of range positions on a scan plane of the detection light.

When the safety controller 1 is brought to a stop, the main module 3 is allowed to read an event history as described above from the safety laser scanner via the compatible port 9.

The safety controller 1 may send the safety control signal to the safety laser scanner connected via the compatible port 9. When the safety control signal includes, for example, a bank number for use in bank switching, and switching is allowed among 16 banks, a total of eight signal lines are provided, with four signal lines representing the bank number with a combination of binary digits made dual-redundant. The safety control signal may include a light emission stop signal for stopping the light emission of the safety laser scanner.

The AUX terminal of the compatible port 9 receives, as the extra information, a warning signal showing that an entry of an object into a warning area set for the safety laser scanner has been detected.

(When the Light Curtain is Connected to the Compatible Port 9)

The light curtain is a multiple-optical-axis photoelectric sensor that includes a light emitter having a plurality of light emitting elements and a light receiver having a plurality of light receiving elements that receive light emitted from the light emitter, and outputs, to the outside, a safety signal generated based on a blocking state of at least one of the plurality of optical axes established between the light emitter and the light receiver. The light curtain may include a memory that stores, as the extra information, time error information on the light curtain and an image of the detection area of each optical axis captured by a camera built in the light curtain. When the safety controller 1 is brought to a stop, the main module 3 may acquire extra information as described above from the light curtain via the compatible port 9. Further, the extra information may include an image or the like related to the amount of light of each optical axis generated from the state information on the light curtain.

As described above, when the safety laser scanner or the light curtain is connected, it is desirable to have, as the extra information, the detection information on the protection area used by the safety input device to generate the input signal.

(Topology of Safety Controller)

Figure 11:
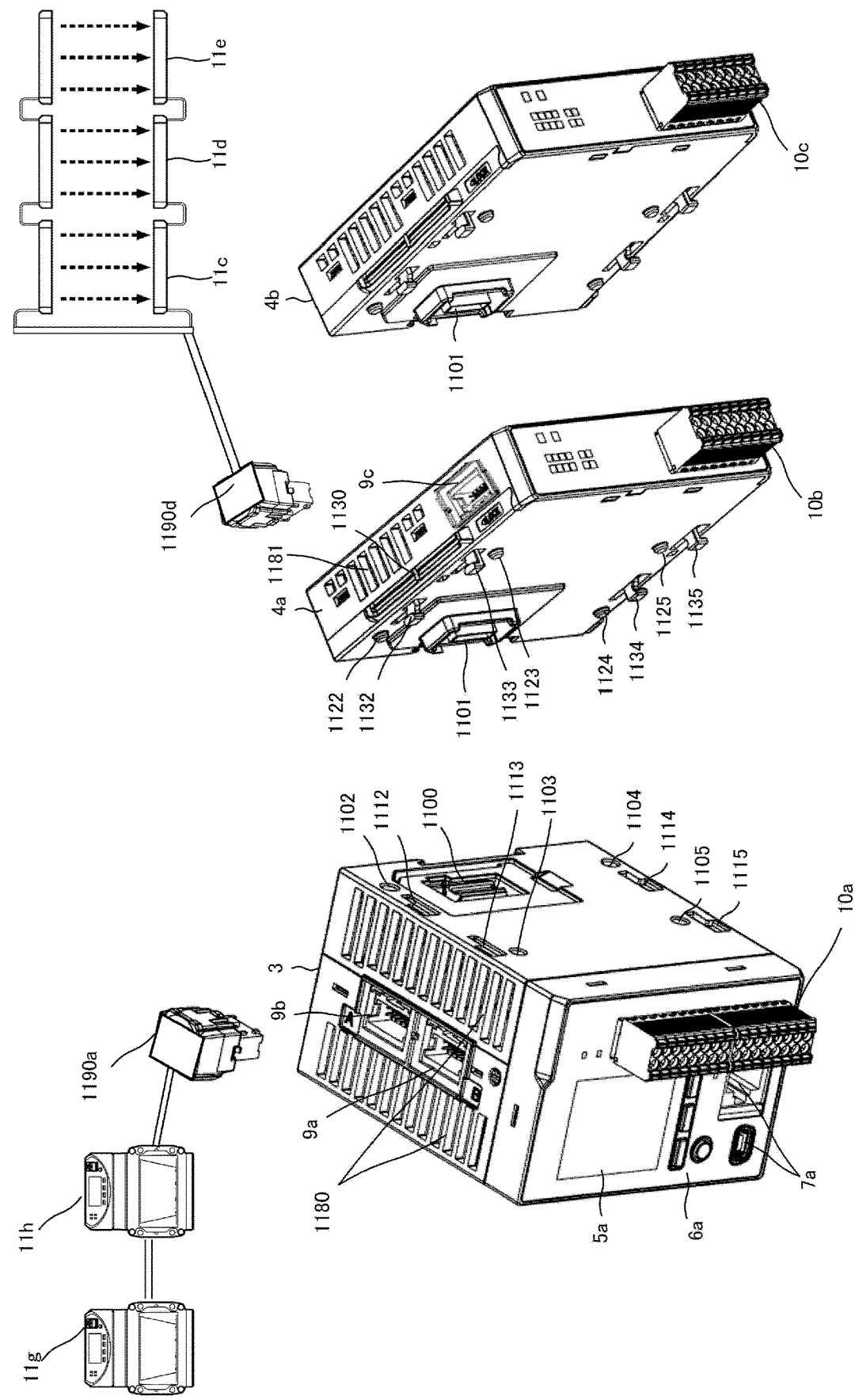
FIG. 11 is a perspective view of the safety controller.
Figure 12:
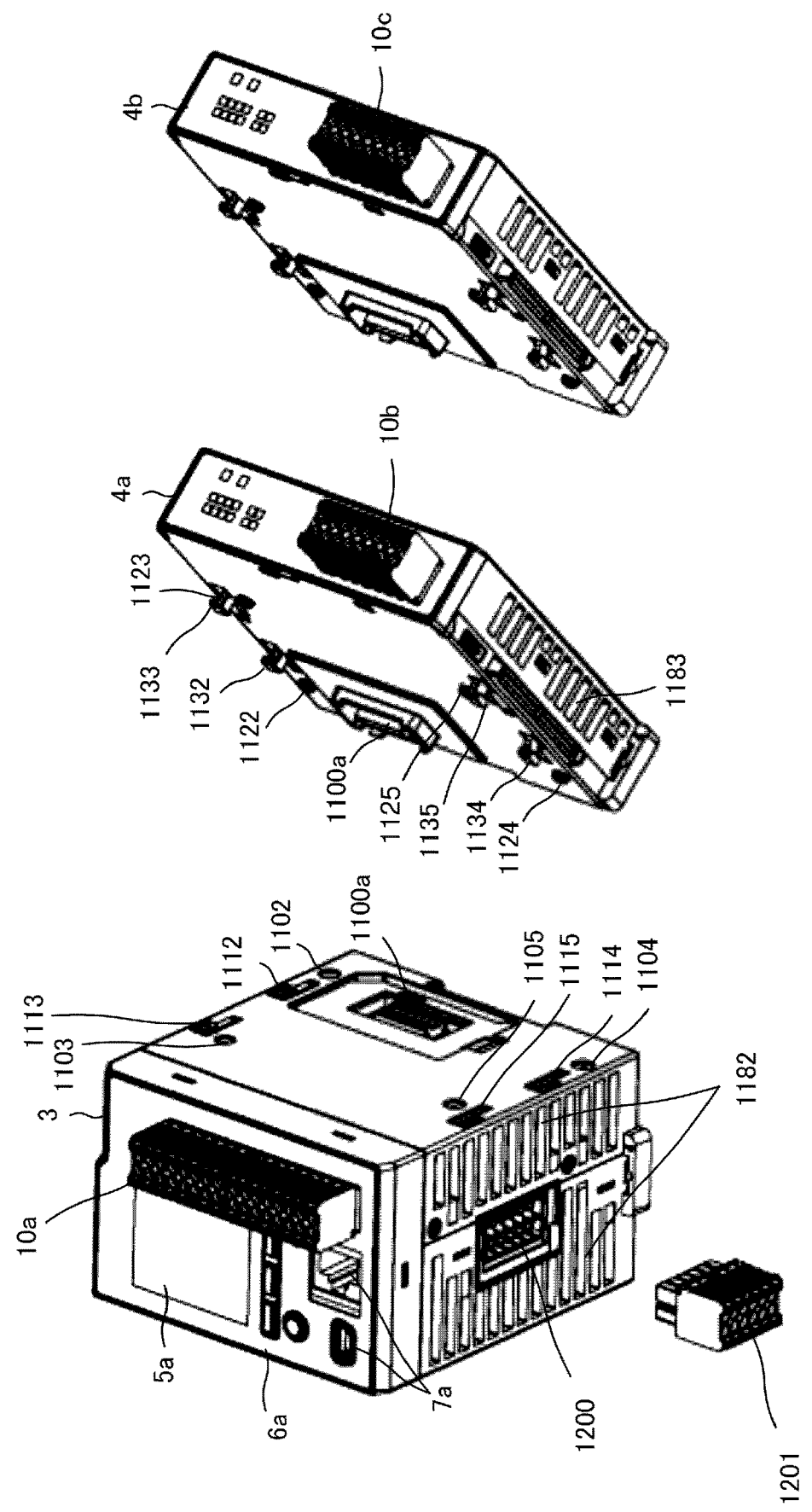
FIG. 12 is a perspective view of the safety controller.

FIG. 11 and FIG. 12 are perspective views of the safety controller. As shown in FIG. 11, the compatible ports 9a, 9b are provided on the upper surface of the main module 3. A port connector 1190a provided at a tip of a cable extending from the safety input device 11 such as the safety laser scanner is connectable to the compatible ports 9a, 9b. A compatible port 9c is provided on the upper surface of the extension module 4a in the same manner. A port connector 1190d provided at a tip of a cable extending from the safety input device 11 such as the light curtain is connectable to the compatible port 9c.

On a right surface of the main module 3, a receptacle 1100 for the bus IF 26a is provided. On a left surface of the extension module 4a, a bus connector 1101 for the bus IF 26b is provided. Connecting the bus connector 1101a and the receptacle 1100 causes the bus IFs 26a, 26b to be communicably connected to each other (connection via an internal bus).

On the right surface of the main module 3, boss grooves 1102, 1103, 1104, 1105 are provided. On the left surface of the extension module 4a, positioning bosses 1122, 1123, 1124, 1125 are provided. When the extension module 4a is connected to the main module 3, the bosses 1122, 1123, 1124, 1125 fit into the boss grooves 1102, 1103, 1104, 1105, respectively, so as to position the extension module 4a relative to the main module 3.

On the right surface of the main module 3, locking grooves 1112, 1113, 1114, 1115 are provided. On the left surface of the extension module 4a, hooks 1132, 1133, 1134, 1135 are provided. When the extension module 4a is securely fixed to the main module 3, the hooks 1132, 1133, 1134, 1135 fit into the locking grooves 1122, 1123, 1124, 1125, respectively. Note that the hooks 1132, 1133, 1134, 1135 have a lever 1130 that is provided on the upper surface of the extension module 4a and is movable in a front-rear direction. Moving the lever 1130 causes the hooks 1132, 1133, 1134, 1135 to move rearward to apply a lock. Moving the lever 1130 causes the hooks 1132, 1133, 1134, 1135 to move forward to release the lock.

The right surface of the extension module 4a is identical in structure to the right surface of the main module 3, and therefore no description will be given of the structure. The extension module 4b is identical in structure to the extension module 4a, and therefore no description will be given of the structure. Since a common structure is applied to these connection surfaces, it is possible to connect the left surface of the extension module 4b to the right surface of the extension module 4a.

As shown in FIG. 12, on the lower surface of the main module 3, a remote IO receptacle 1200 is provided. To the remote IO receptacle 1200, a remote IO connector 1201 provided at a tip of a cable extending from the remote IO unit is connected. The remote IO unit is a unit for connecting, to the main module 3, a safety input device or a safety output device located away from the main module 3.

In the meantime, the main module 3 and the extension modules 4a, 4b do not have sufficient free space left on their respective rear surfaces, front surfaces, right surfaces, and left surfaces due to a basic use as the safety controller. For example, the rear surfaces of the main module 3 and the extension modules 4a, 4b each have a connection groove or a backplane for connection to a DIN rail. A display surface, an I/O connector, and the like are present on the front surfaces of the main module 3 and the extension module 4. On the left and right surfaces, receptacles and the like for the bus IF 26a are placed. Therefore, there is no space for installing another port on these surfaces.

Therefore, the upper and lower surfaces of the main module 3 and the extension module 4 can be considered as places for installing another port. On the upper or lower surfaces of the main module 3 and the extension module 4, the remote IO receptacle 1200 for the compatible ports 9b, 9c and the remote IO port may be provided.

When heat-dissipating holes 1180, 1181, 1182, 1183 are provided on both the upper and lower surfaces of the main module 3 and the extension modules 4a, 4b, only a small space is left. In this case, only a limited space is available for placement of another port. Therefore, for example, the compatible ports 9b, 9c may be placed on the upper surfaces of the main module 3 and the extension module 4, and the remote IO receptacle 1200 for the remote IO port may be provided on the lower surfaces of the main module 3 and the extension module 4 (vertically-distributed placement). Alternatively, the remote IO receptacle 1200 for the remote IO port may be provided on the upper surfaces of the main module 3 and the extension module 4, and the compatible ports 9b, 9c may be provided on the lower surfaces of the main module 3 and the extension module 4.

<Summary>

As shown in FIG. 1, the safety controller 1 is an example of the safety controller. As shown in FIG. 2, the safety input IF 21 and the compatible port 9 each serve as an input part to which an input signal is input from at least one safety input device or safety sensor (for example, the light curtain, the door switch, or the safety laser scanner). The MCU 23 and the execution engine 801 each serve as a safety control part that performs a predetermined operation on the input signal to obtain an output signal, and outputs, as the output signal, an ON signal that permits the actuator to operate or an OFF signal that brings the actuator to a stop. The MCU 23 and the extra information acquisition part 805 each serve as an acquisition unit that acquires, from at least one safety input device or safety sensor, extra information (for example, sensor information) that is not used for obtaining the output signal. The MCU 23 and the history recording part 807 each serve as a history recording unit that records the input signal and the output signal together with the extra information as history information (for example, the history data 18). As described above, recording the history related to the operation of the safety program can contribute to a determination of the cause of the false OFF signal. For example, when sensor information on an installation failure of the safety sensor is recorded as a history, the user may correct the installation of the safety sensor to prevent the false OFF signal from being output. This will allow industrial machines to increase a production efficiency.

As shown in FIG. 4, the safety control part (for example, the MCU 23) may be configured to repeatedly execute the safety program 16 at every scan cycle, the safety program 16 including a plurality of function blocks that each perform a logical operation on the input signal or a signal obtained through an operation on the input signal. As shown in FIG. 8, the history recording unit (history recording part 807) may record the input signal and the output signal together with the extra information as the history information at every scan cycle that is a predetermined recording interval. Since the scan cycle has an interval that is extremely short for monitoring the safety program, it is possible to provide the user with a lot of information to determine the cause of the false OFF signal.

As shown in FIG. 8, the acquisition unit (for example, the MCU 23) may be configured to communicate with at least one safety input device or safety sensor to acquire the extra information at communication intervals longer than the scan cycle. The extra information may be information that is less prone to change than the input signal or the output signal. Frequent communications of such extra information may place a load on the MCU 23 and the bus IF 26, thereby making the scan cycle longer. Therefore, the use of communication intervals different from the scan cycle reduces the load on the MCU 23 and the bus IF 26.

The history recording unit (for example, the MCU 23 and the FB information acquisition part 804) may be configured to further acquire states of the plurality of function blocks and record the states as history information at every scan cycle. This will facilitate a determination of the cause of the false OFF signal due to a bug in the safety program.

The history recording unit (for example, the change determination part 812) may record, when history information acquired at the current scan cycle and the latest history information recorded in the history recording unit are different, the history information acquired at the current scan cycle, and need not record, when the history information acquired at the current scan cycle and the latest history information recorded in the history recording unit are identical, the history information acquired at the current scan cycle. This will allow the history data 18 to be compressed based on change points.

The main module 3 and the extension module 4 may further include a real-time clock. The history recording unit (for example, the record creation part 811) may add, to the history information, time information acquired from the real-time clock as a time stamp and record the history information. This will facilitate a determination when the false OFF signal has occurred.

The time synchronization part 802 serves as a time synchronization unit that synchronizes the real-time clock 803 of the safety controller and the real-time clock of at least one safety input device or safety sensor. The correction part 806 may serve as a correction unit for the time information of the extra information with a communication processing time required for communication with at least one safety input device or safety sensor. The history recording unit (for example, the history recording part 807) records the extra information based on the time information corrected by the correction unit. Suppose that the signal acquired from the safety input device connected to the main module 3 and the extra information acquired through bus communication from the safety input device connected to the extension module 4 are time-stamped by the real-time clock 803 of the main module 3. In this case, the time stamp of the extra information is later than a time when the extra information is actually acquired and sent by the safety input device. This is because there is a communication processing time. Therefore, correcting the time stamp of the extra information to a past time by the communication processing time will make the time stamp of the extra information more accurate.

The at least one safety input device or safety sensor may be the light curtain. In this case, the extra information may include at least one of information showing ON/OFF of an optical axis of the light curtain, information showing the amount of light of each optical axis of the light curtain, information showing an error that has occurred in the light curtain, information showing a mute state of the light curtain, or information showing that the light curtain is waiting to be reset. These pieces of information will serve as reference information for use in determination of the false OFF signal generated due to the light curtain.

The at least one safety input device or safety sensor may be the safety laser scanner. In this case, the extra information may include at least one of information showing ON/OFF of an optical axis of the safety laser scanner, information showing a measured length or amount of light of each optical axis of the safety laser scanner, information showing an error that has occurred in the safety laser scanner, information showing a mute state of the safety laser scanner, information showing that the safety laser scanner is waiting to be reset, or image information acquired by a camera provided in the laser scanner. These pieces of information will serve as reference information for use in determination of the false OFF signal generated due to the safety laser scanner.

The at least one safety input device or safety sensor may be the door switch. In this case, the extra information may include at least one of information showing lock control of the door switch, information showing an error that has occurred in the door switch, information showing a mute state of the door switch, or information showing that the door switch is waiting to be locked. These pieces of information will serve as reference information for use in determination of the false OFF signal generated due to the door switch.

The history recording part 807 may be configured to record the image data acquired by the camera as the history information. The main module 3 is connectable with a camera and capable of receiving image data acquired by the camera. For example, the camera may be installed so as to capture an image of the safety input device, the safety sensor, the safety output device (actuator), or the like. Note that the image data is much larger in information volume than the safety input signal or the safety output signal. This will allow the user to easily determine the cause of the false OFF signal by checking the image data. On the other hand, in order to reduce the size of the history data 18, the history recording part 807 may record the image data only when the safety output signal changes (changes from ON to OFF).

The PC 2 serves as a history display device that displays the history information recorded by the safety controller. In this case, the control panel 6b and the display condition selection section 33 serve as a selection unit that selects any history record from among a plurality of history records included in the history information. The CPU 13 serves as a display unit that displays the history record selected by the selection unit on the display device.

As shown in FIG. 4, the CPU 13 may reflect, in function block icons each associated with a corresponding one of a plurality of function blocks making up the safety program to be executed by the safety controller, ON/OFF states of the plurality of function blocks included in the history information and displays the function block icons on the display device.

As shown in FIG. 4, the CPU 13 may display a state of the input signal as a state of a function block of an input type and display a state of the output signal as a state of a function block of an output type.

As shown in FIG. 5, the CPU 13 may display, in a time chart form, states of a plurality of the input signals and a state of at least one of the output signals included in the history information.

As shown in FIG. 5, the CPU 13 may display, in a time chart form, states of the plurality of function blocks recorded in the history information, the plurality of function blocks making up the safety program to be executed by the safety controller.

As described with reference to FIG. 4 and FIG. 5, the CPU 13 may serve as an extraction condition reception unit that receives an extraction condition for extracting a history record to be displayed. Furthermore, the CPU 13 may serve as an extraction unit that extracts, from the history information, a history record satisfying the extraction condition and creates a list (for example, the history list 36). The CPU 13 may display the state of the input signal and the state of the output signal included in the history record selected from the list by the selection unit.

The CPU 13 may serve as a designation reception unit that receives a designation of a safety input device or a safety sensor, the extra information on which is to be displayed. As shown in FIG. 6, the CPU 13 may read the extra information on the safety input device or the safety sensor corresponding to the designation received by the designation reception unit from the history information and display the extra information.

The invention is not limited to the above-described embodiment, and various modifications or changes may be made within the scope of the invention.

What is claimed is:

1. A safety controller comprising:
   an input part to which an input signal is input from at least one safety input device or safety sensor;
   a safety control part that performs a predetermined operation on the input signal to obtain an output signal and outputs, as the output signal, an ON signal that permits an actuator to operate or an OFF signal that brings the actuator to a stop;
   an acquisition unit that acquires, from the at least one safety input device or safety sensor, extra information that is not used for obtaining the output signal; and
   a history recording unit that records the input signal and the output signal together with the extra information as history information.

2. The safety controller according to claim 1, wherein the safety control part is configured to repeatedly execute, at every scan cycle, a safety program including a plurality of function blocks that each perform a logical operation on the input signal or a signal obtained through an operation on the input signal, and
   the history recording unit records the input signal and the output signal together with the extra information as the history information at every scan cycle.

3. The safety controller according to claim 2, wherein the acquisition unit is configured to communicate with the at least one safety input device or safety sensor at communication intervals longer than the scan cycle to acquire the extra information.

4. The safety controller according to claim 2, wherein the history recording unit is further configured to acquire states of the plurality of function blocks and record the states as the history information at every scan cycle.

5. The safety controller according to claim 2, wherein the history recording unit records, when history information acquired at a current scan cycle and latest history information recorded in the history recording unit are different, the history information acquired at the current scan cycle, and does not record, when the history information acquired at the current scan cycle and the latest history information recorded in the history recording unit are identical, the history information acquired at the current scan cycle.

6. The safety controller according to claim 2, further comprising a real-time clock, wherein the history recording unit adds, to the history information, time information acquired from the real-time clock as a time stamp and records the history information.

7. The safety controller according to claim 6, further comprising:
   a time synchronization unit that synchronizes the real-time clock of the safety controller and a real-time clock of the at least one safety input device or safety sensor; and
   a correction unit for the time information of the extra information with a communication processing time required for communication with at least one safety input device or safety sensor, wherein
   the history recording unit records the extra information based on the time information corrected by the correction unit.

8. The safety controller according to claim 1, wherein
   the at least one safety input device or safety sensor is a light curtain, and
   the extra information includes at least one of information on the light curtain showing ON/OFF of an optical axis, information on the light curtain showing an amount of light of the optical axis, information showing an error that has occurred in the light curtain, information showing a mute state of the light curtain, or information showing that the light curtain is waiting to be reset.

9. The safety controller according to claim 1, wherein
   the at least one safety input device or safety sensor is a safety laser scanner, and
   the extra information includes at least one of information on the safety laser scanner showing ON/OFF of an optical axis, information on the safety laser scanner showing a measured length or amount of light of each optical axis, information showing an error that has occurred in the safety laser scanner, information showing a mute state of the safety laser scanner, information showing that the safety laser scanner is waiting for release of a reset, or image information acquired by a camera provided in the safety laser scanner.

10. The safety controller according to claim 1, wherein
    the at least one safety input device or safety sensor is a door switch, and
    the extra information includes at least one of information showing lock control of the door switch, information showing an error that has occurred in the door switch, information showing a mute state of the door switch, or information showing that the door switch is waiting to be locked.

11. The safety controller according to claim 1, wherein the history recording unit is configured to record image data acquired by a camera as the history information.

12. A history display device that displays history information recorded by a safety controller, the safety controller including
   an input part to which an input signal is input from at least one safety input device or safety sensor,
   a safety control part that performs a predetermined operation on the input signal to obtain an output signal and outputs, as the output signal, an ON signal that permits an actuator to operate or an OFF signal that brings the actuator to a stop,
   an acquisition unit that acquires, from the at least one safety input device or safety sensor, extra information that is not used for obtaining the output signal, and
   a history recording unit that records the input signal and the output signal together with the extra information as history information,
   the history display device comprising:
   a selection unit that selects any history record from among a plurality of history records included in the history information; and
   a display unit that displays the history record selected by the selection unit on a display device.

13. The history display device according to claim 12, wherein the display unit reflects, in function block icons each associated with a corresponding one of a plurality of function blocks making up a safety program to be executed by the safety controller, ON/OFF states of the plurality of function blocks included in the history information and displays the function block icons on the display device.

14. The history display device according to claim 13, wherein the display unit is configured to display a state of the input signal as a state of a function block of an input type and to display a state of the output signal as a state of a function block of an output type.

15. The history display device according to claim 12, wherein the display unit displays, in a time chart form, states of a plurality of the input signals and a state of at least one of the output signals included in the history information.

16. The history display device according to claim 15, wherein the display unit displays, in a time chart form, states of a plurality of function blocks recorded in the history information, the plurality of function blocks making up the safety program to be executed by the safety controller.

17. The history display device according to claim 12, further comprising:
   an extraction condition reception unit that receives an extraction condition for extracting a history record to be displayed; and
   an extraction unit that extracts, from the history information, a history record satisfying the extraction condition and creates a list, wherein
   the display unit displays a state of the input signal and a state of the output signal included in a history record selected from the list by the selection unit.

18. The history display device according to claim 12, further comprising a designation reception unit that receives a designation of a safety input device or a safety sensor, the extra information on which is to be displayed, wherein
   the display unit reads the extra information on the safety input device or the safety sensor corresponding to the designation received by the designation reception unit from the history information and displays the extra information.

\* \* \* \* \*